United States Patent [19]

Sitkus

[11] Patent Number: 4,650,437

[45] Date of Patent: Mar. 17, 1987

[54] MODULAR CONSTRUCTION SET

[76] Inventor: Paul V. Sitkus, 19 Glastonbury Dr., Nashua, N.H. 03063

[21] Appl. No.: 733,072

[22] Filed: May 13, 1985

[51] Int. Cl.$^4$ .......................................... A63H 33/08
[52] U.S. Cl. .................................. 446/128; 446/85; 446/117; 434/72
[58] Field of Search ................ 446/85, 111, 113, 117, 446/122, 124, 128; 434/72

[56] References Cited

U.S. PATENT DOCUMENTS

| 1,648,706 | 11/1927 | Walker | 446/113 X |
| 2,873,519 | 2/1959 | Walters | 446/111 X |
| 2,936,544 | 5/1960 | Kohner | 446/117 |
| 3,220,141 | 11/1965 | Goss | 446/117 X |
| 3,224,137 | 12/1965 | Wright et al. | 446/124 X |
| 4,058,909 | 11/1977 | Poleri | 434/72 |
| 4,270,903 | 6/1981 | Xanthopoulos | 446/115 |

FOREIGN PATENT DOCUMENTS

| 54259 | 2/1967 | German Democratic Rep. | 446/128 |
| 429509 | 8/1936 | United Kingdom | 446/124 |

Primary Examiner—F. Barry Shay
Attorney, Agent, or Firm—Robert T. Dunn

[57] ABSTRACT

A construction set of modular pieces for constructing a scale model of an arrangement of contemporary buildings, such as a complex or cluster of high and low rise buildings located on common plaza areas, is made of several kinds of modular plaza blocks, building blocks, joint pieces for connecting the plaza blocks together, inside rail pieces for providing ridges on the top of the plaza blocks for connecting the building blocks thereto and outside or inside rail pieces for providing railings where desired on a plaza; all of the plaza blocks, building blocks, connecting pieces and rail pieces having dimensions of width and length that are whole number (integer) multiples of the same dimension D, whereby a variety of arrangements of plaza blocks, buildings blocks, and plaza railings may be constructed from a set of such blocks and pieces.

12 Claims, 32 Drawing Figures

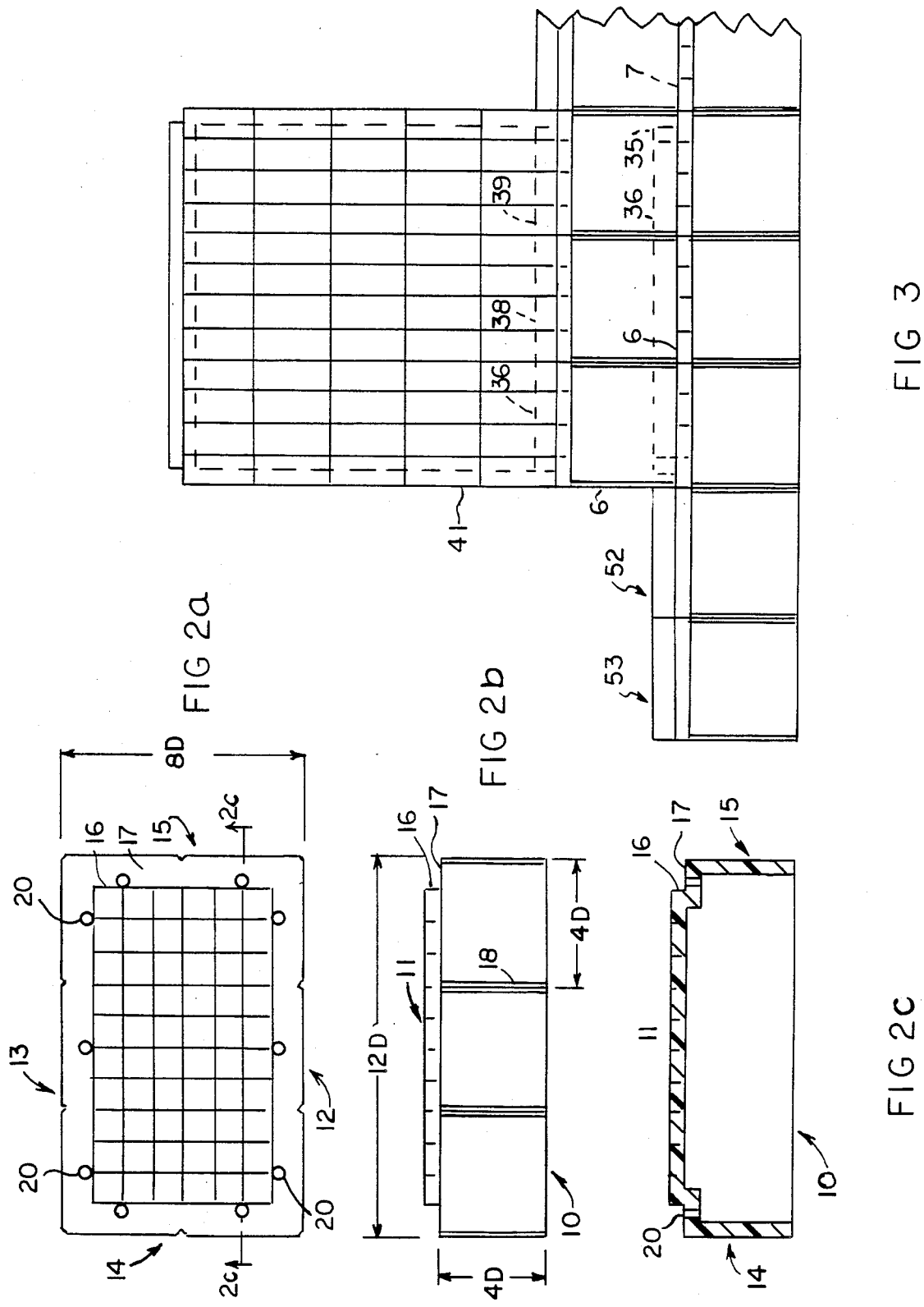

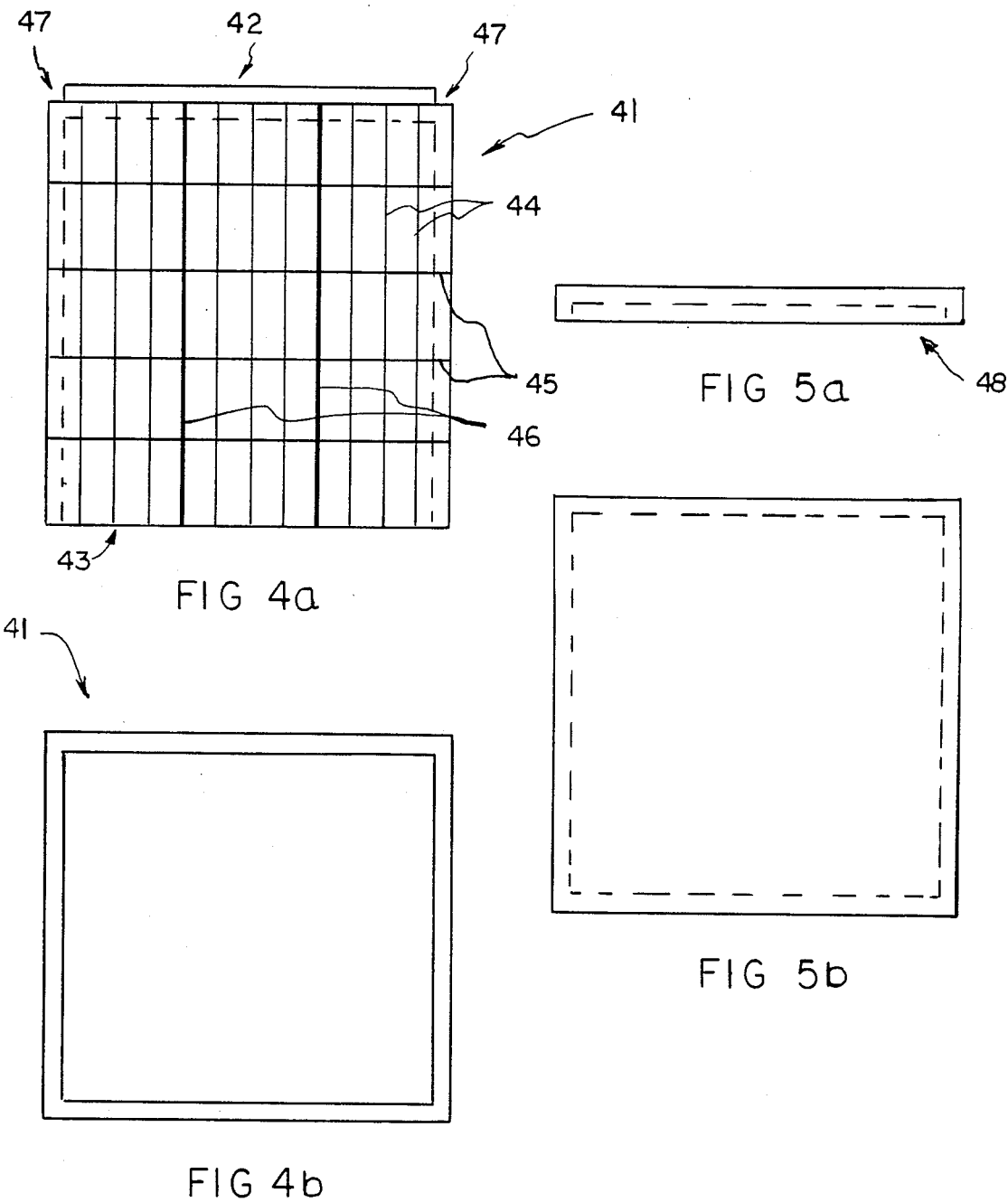

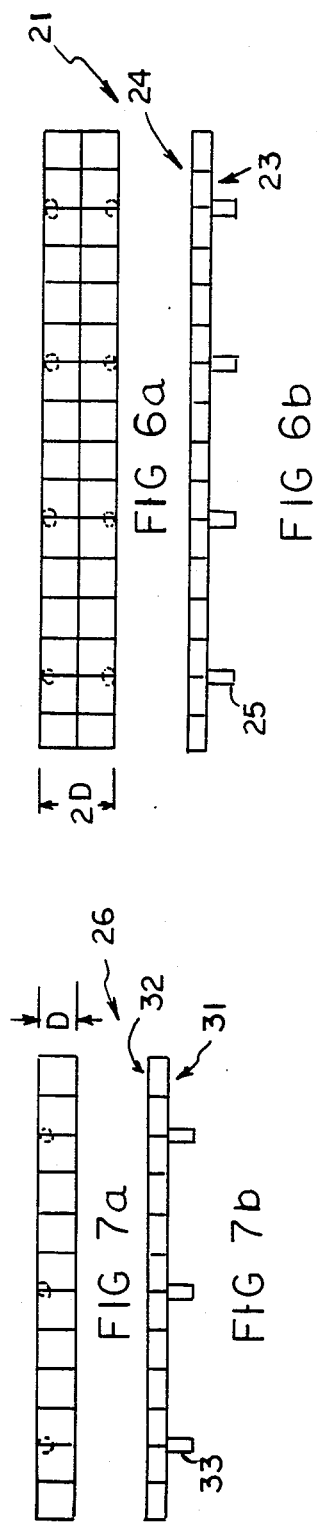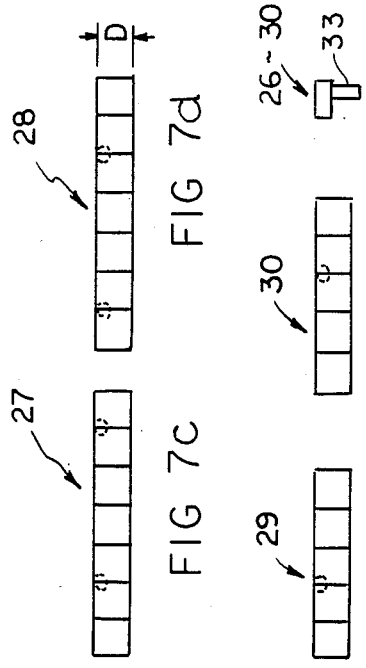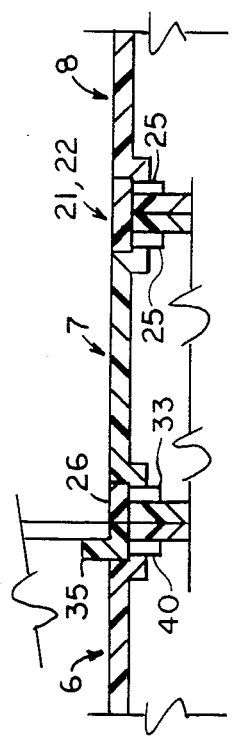

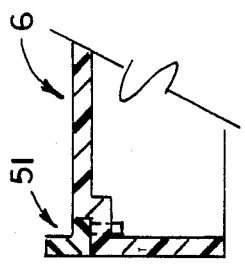
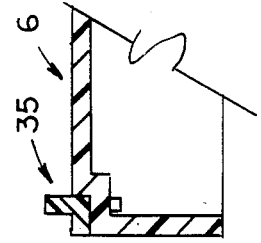
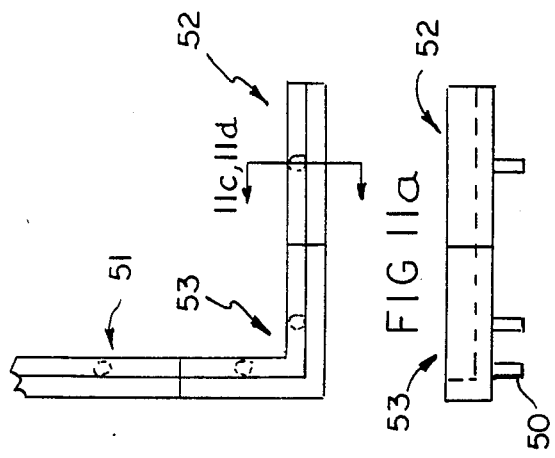
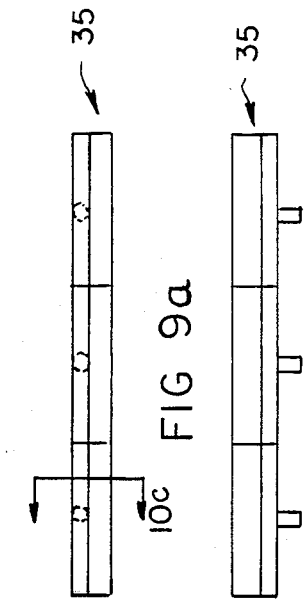
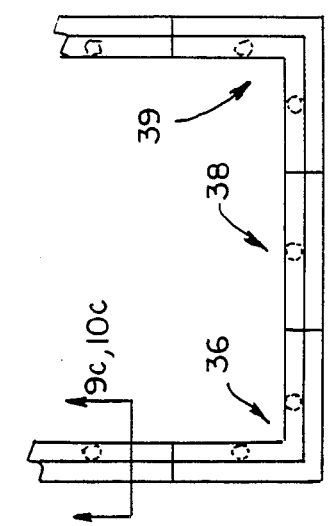
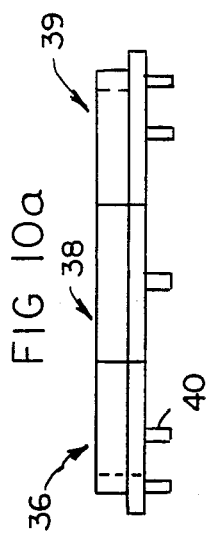

MODULAR CONSTRUCTION SET

BACKGROUND OF THE INVENTION

This invention relates to model buildings and particularly to construction sets or kits including a plurality of modular parts to form the model buildings for constructing a wide variety of buildings and arrangements of buildings.

Modular construction sets that include a plurality of modular parts for constructing a model of a building or a complex of buildings having a realistic appearance have been provided in the past. Such construction sets are sometimes used by architects and building contractors in visualizing and planning a new building, by constructing a model of the building to demonstrate the layout and arrangement. Such construction sets are also used to construct a model of a building for exhibition purposes. For example, they are used to show alternate arrangements of the building that can be examined and compared.

The existing construction sets for these purposes sometimes provide interlocking modular elements that can be arranged and connected together and when completed will stay for an extended period of time and will not fall apart of collapse. It is preferred that the components of the construction set, when so assembled be held together without bonding so that later they can be taken part and used again. Typically, such construction sets include modular doors, windows, walls, roofs, and other building parts whereby the user constructs a building of a particular design and arrangement of the parts. Such construction sets may include interior walls for defining rooms and passages within the building. Others identify in detail the structural members and show the arrangement of the structural members and coverings that define interior and exterior walls, surfaces, floors, ceilings, etc. and are used as a teaching aid to instruct construction tradesmen in the performance of their job.

Heretofore, construction sets such as those described above have been adequate and used as aids to show in miniature a given building construction. However, in recent years construction of business and office buildings in cities and suburbs has been carried out according to large area plans that call for the development of a large area that will accommodate many buildings. In these plans, buildings are erected in clusters of several high rise office buildings on a common plaza that provides walkways, gardens, rest areas, etc. between the buildings.

It is the principal object of the present invention to provide a construction set of a plurality of several modular parts from which the user can construct a model of a cluster or complex of high-rise buildings with interconnecting plazas between the buildings that bears a close resemblance to the real complex of buildings.

It is another object of the present invention to provide such a construction set of modular parts that can be assembled to realistically present a complex of high-rise buildings and with which the modular parts are readily connected and disconnected so that a variety of arrangements of buildings, building sizes, and interconnecting plazas can be constructed from the set.

It is another object to provide such a construction set that has interlocking modular blocks and pieces which interlock conveniently and reliably and are readily dismantled.

SUMMARY OF THE INVENTION

A construction set of modular pieces for constructing a scale model of an arrangement of contemporary buildings, such as a complex of high and low rise buildings having common plaza areas is made of several kinds of modular plaza blocks, building blocks and connecting, rail and edge pieces.

According to the present invention, the construction set includes a plurality of plaza blocks that are all regular right angle parallelepiped blocks each having a bottom, top, and four sides that define the block dimensions of height, width, and length, all having width and length dimensions that are whole number (integer) multiples of a common dimension D and having a step of tread Dimension D that is uniform around the perimeter of the top of the plaza block. The plaza blocks are connected together at their top perimeter step using joint pieces that join the plaza blocks side-by-side. Building blocks and other plaza blocks fit on top of the plaza blocks by fitting snugly over inside rail pieces that fit in the plaza block steps.

In a preferred embodiment, the outside top edges of plaza blocks not covered by a building block are fit with outside rail pieces or edge fill pieces to complete the plaza areas.

DESCRIPTION OF THE DRAWINGS

FIGS. 2a, 2b and 2c are views of a typical plaza block;

FIG. 3 is a side view of several plaza blocks forming plaza areas at two levels and a building block rising from the upper plaza level;

FIGS. 4a and 4b are front/side and top/bottom views of a typical high rise building block;

FIGS. 5a and 5b are front/side and top views of a building cap;

FIGS. 6a and 6b and 6c and 6d are top and side views of two plaza block joint pieces of different lengths and FIG. 6e is an end view of either of the two;

FIGS. 7a to 7g are views of plaza block straight edge fill pieces of which: FIGS. 7a and 7b are top and front views of an even length (12D) piece; FIGS. 7c and 7d are top views of odd length (7D) pieces; FIGS. 7e and 7f are top views of odd length (5D) pieces; and FIG. 7g is an end view of any of them;

FIG. 8 is a cross section view of several side by side plaza blocks with the adjacent step of one containing a fill piece and the other containing an inside rail piece for attaching a high rise building block to the plaza blocks;

FIGS. 9a to 9c are views of a plaza block inside rail piece of which: FIG. 9a is a top view; FIG. 9b is a front view; and FIG. 9c is a cross section view of a plaza block with inside rail piece attached;

FIGS. 10a to 10c are views of a plaza block inside rail straight and corner pieces for attaching a high rise building block or plaza block to the plaza block of which: FIG. 10a is a top view; FIG. 10b is a front view; and FIG. 10c is an end view; and FIGS. 11a to 11d are views of plaza block outside rail straight and corner pieces of which: FIG. 11a is a top view; FIG. 11b is a front view; FIG. 11c is an end view;

and FIG. 11*d* is a cross section view of the pieces attached to a plaza block.

DESCRIPTION OF EMBODIMENTS OF THE INVENTION

Figure 1:
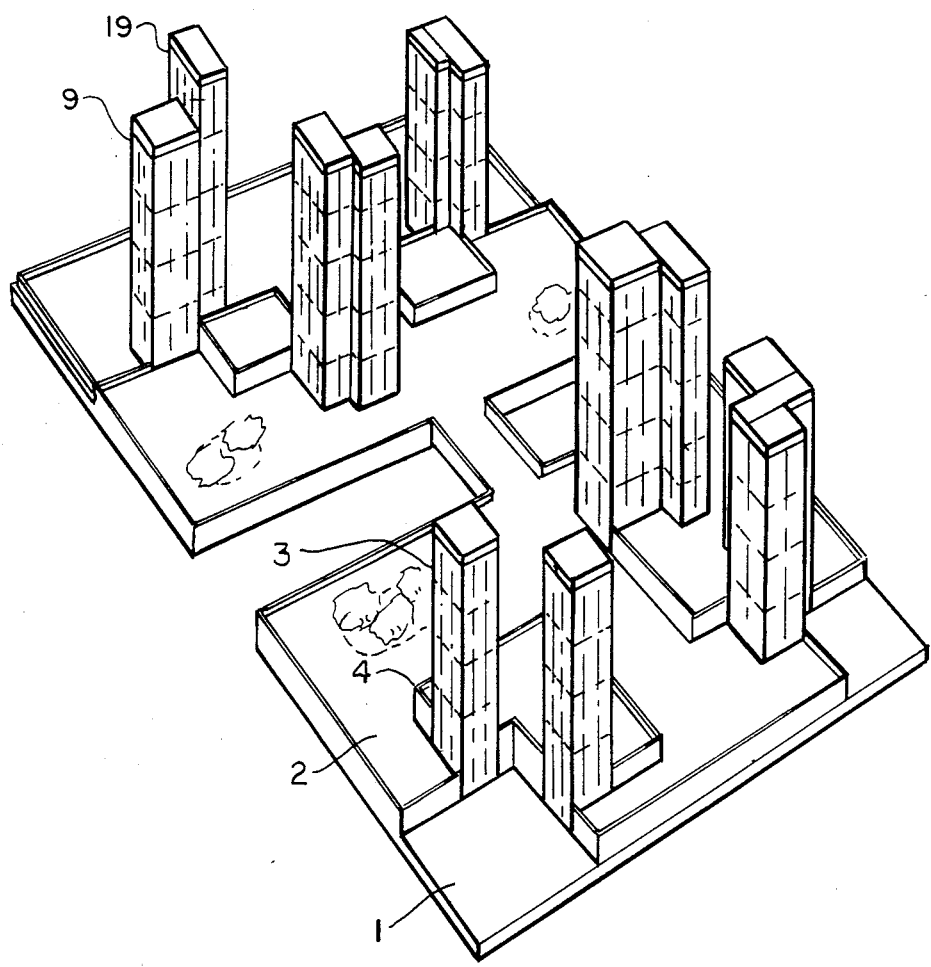
FIG. 1 is a top-side view of an assembly of modular plaza and building blocks and pieces forming a scale model of a high rise building and plaza area complex.

FIG. 1 shows a complex of office buildings of different sizes and interconnected plazas that provide plaza areas of several levels. The present invention provides modular parts consisting of plaza blocks, building blocks and various connecting rail and fill pieces for constructing many different model building complexes including the one shown in FIG. 1. According to the present invention all blocks and pieces have dimensions that are integer multiples of the same common dimension D so that they can fit together in many ways and so from the set many arrangements of buildings and places can be constructed. The arrangements are limited only by the user's imagination.

In FIG. 1, plaza areas such as 1 and 2 are different levels and are constructed from modular plaza blocks of uniform height. The lower level 1 is the height of one plaza block and the higher level 2 is the height of two plaza blocks, one on top of another. The high and low rise buildings such as 3 and 4 on plaza level 2 can be constructed of the same building blocks; they are arranged side by side to construct the low rise 4 and on top of each other to construct the high rise 3. High rise buildings 9 and 19 are contiguous along a portion of one side of each and are different heights. With this technique in mind, turn next to FIGS. 2, 3 and 6 which show details of the modular plaza blocks and connector pieces.

A modular plaza block is shown in FIGS. 2*a*, 2*b*, and 2*c*. It is a right angle parallelepiped having a bottom 10, a top 11 and four sides 12, 13, 14, and 15 that define the block dimensions of height, width and length. In this embodiment, all plaza blocks are the same height and all have width and length dimensions that are integral multiples a dimension D. The top edges of each plaza block define a step 16 of tread 17 dimension D that is uniform around the top edge (perimeter of the top) of the plaza block.

The block shown in FIG. 2 is 12D long, and 8D wide. The height may also be an integer multiple of D. As shown in FIG. 2*b* the height of the step 16 may be ½D and (as mentioned) the step tread is D. The front, back and sides, as shown in FIG. 2*b* may have vertical grooves like 18 to define panels or sections that are 4D wide. FIG. 2*c* is a cross-section view of the plaza block taken as shown in FIG. 2*a*. As shown, the block is open at the bottom and essentially hollow to minimize weight The side wall thickness at the bottom may be ½D for reasons explained more fully below. Pin holes 20 are arranged 4D apart along the tread 17 of the top perimeter step.

A plurality of modular right angle parallelepiped joint pieces for joining side by side plaza blocks are provided Two of these are shown in FIGS. 6*a*, 6*b*, 6*c* and 6*d*. Each joint piece like 21 or 22 has a bottom 23, a top 24 and four sides that define the piece dimensions of height, width and length and all are the same height, equal to the rise (½D) of a plaza block top perimeter step. The width of the joint pieces are all 2D (two-step treads) and their lengths are integral multiples of D Joint piece 21 is 16D long and 22 is 10D long. Each joint piece has pins (projections) 25 on the bottom that fit pin holes 20 (receptacles) in the plaza block step treads, so that a joint piece fills the adjacent steps of side by side plaza blocks with the pins 25 thereof in the step tread holes 20 of both blocks, and so joins side by side plaza blocks like 7 and 8 together as shown by FIG. 8.

A plurality of right angle parallelepiped straight edge fill pieces are provided. Five of these 26, 27, 28, 29 and 30 are shown by FIGS. 7*a* to 7*g*. These are provided for filling the plaza block top perimeter step where the step is not adjacent another plaza block or where the adjacent plaza block step carries an inside rail piece such as shown by FIGS. 9*a*, 9*b* and 9*c*. Each straight edge piece like 26 has a bottom 31, a top 32 and four sides that define the piece dimensions of height, width and length. All straight edge pieces are the same height, equal to the rise of a plaza block top perimeter step 16, their widths are all equal to D (one step tread) and their lengths are all integer multiples of D. Piece 26 is 12D long, 27 and 28 are 7D long and 29 and 30 are 5D long. Pins like 33 on the bottom of each straight edge piece fit the holes 20 in the plaza block step treads 17 for fastening the pieces to the blocks to fill the plaza block top perimeter step as described.

FIG. 8 is a cross-section view showing a fill piece like 26 alongside an inside rail piece 35 of two side by side plaza blocks 6 and 7.

Plaza blocks are preferably an integer number of sections (not less than two) long and wide, and, as already mentioned, a setion is 4D. For example, the plaza block as shown in FIGS. 2*a* to 2*c* is two sections by three sections. Thus, the plaza blocks are 8D, 12D, 16D, 20D, etc. long and wide and 4D (one section) high. The pin holes like 20 in the top step of the plaza block are preferably each located at the middle of a section (midway between grooves 18) and so are 4D apart. The joint pieces like 21 and 22 are then an even integer multiple of D long, and the pins like 25 are spaced symmetrically on either side of the center of the piece.

Fill pieces like 26 may be as short as 2D. Those an even integer multiple of D long, like 26, have pins like 33 spaced symmetrically on either side of the center of the piece. Those like 27 to 30, an odd integer multiple of D long, are left handed (L) or right handed (R), like 27 and 28 (both 7D long) or like 29 and 30 (both 5D long). For example, 27 is denoted ODD-R and 28 is denoted ODD-L. For the odd integer multiple of D long pieces, the pins are not spaced symmetrically from the center, they are spaced to the left (L) or to the right (R) of center.

The inside rail piece like 35 is shown in FIGS. 9*a*, 9*b* and 9*c* and inside rail corner pieces 36 and 39 are shown by FIGS. 10*a* and 10*b*. These inside rail pieces provide a rail that projects upward from the top surface of a plaza block like block 6 and are attached thereto by pins 40 that fit in holes 20 in the top step of a plaza block. The inside rail pieces fit inside the bottom of a building block or plaza block, like the building block 41 and plaza block 6 shown in FIG. 3. This fit is snug and holds the building blocks and plaza blocks in place on a platform of plaza blocks as shown in FIGS. 1 and 3.

A typical building block, like 41, is shown in detail by FIGS. 4*a* and 4*b*. FIG. 4*a* is a front or side view of building block 41. Each building block has a top 42, a bottom 43, and four sides and may be square as viewed from the top or bottom, or may be rectangular. All building blocks may be the same height (modular height) that is preferably the height of the lowest height building that will likely be constructed. For example, the modular height may be five stories (building floors)

and so buildings of five, ten, fifteen, etc. stories may be constructed.

Building block 41 is five stories high and may have vertical grooves or lines 44 and horizontal grooves or lines 45 on each each face to define each floor and the windows or building panels of each floor. On the other hand, horizontal grooves or lines may be omitted to leave the number of stories undefined. FIG. 4a shows a side of building block 41 that is 12D wide and a vertical line, like 44 at each dimension unit D. The floors are defined by lines 45 and each fourth vertical line like 46 may be accented. In this example each floor is 3D high.

The building blocks are made to fit one on top of another and for that purpose each block has a step like 47 around the top perimeter that the bottom (shown in FIG. 4b) of another building block fits snugly to. The step need not be the same rise and tread as a plaza block top step 16 and 17 (See FIGS. 2a to 2c), because it need only fit the bottom of another building block. The top building block of a building may be fit with a top cap 48 shown by FIGS. 5a and 5b that fits snugly on the top block of a stack of building blocks. The top cap may be transparent to reveal whatever finish and color is applied to the building block. Also, the top cap may include structures to represent a penthouse, garden, etc. often provided on top of contemporary high rise buildings.

The building blocks are modular and fit together as described herein and may be surfaced for other effects. For example, the sides may be reflective (mirror-like) in various colors, or have tinted transparent surfaces of various colors to resemble the exteriors of typical modern high rise office buildings. The vertical lines like 46 may be grooves to simulate the texture of the building face. On the other hand, the horizontal lines may be omitted, leaving the number of stories undefined, allowing building blocks to be assembled as a scale model in a variety of scales.

A plurality of outside straight and outside right angle corner rail pieces are also provided for filling a plaza block top perimeter step at an outside corner thereof, where the step is not adjacent another plaza block and provides an outside railing along the perimeter. Several outside rail pieces are shown by FIGS. 11a to 11d. Each fills the plaza block step and provides part of an outside railing and has pins 50 on the bottom that fit the holes in the plaza block step treads, so that the piece fills the plaza block top perimeter step at an outside corner thereof where the step is not adjacent another plaza block and provides a railing. The straight outside rail pieces like 51 and 52 meet the legs of the right angle corner rail piece 53 and appear on a plaza area as shown in FIG. 3.

The modular construction set described herein including plaza blocks, building blocks, joining pieces and inside and outside rail pieces of which dimensions are integer multiples of D as described, includes a number of each block and piece and several modular sizes of each, to provide the user with all parts to build a complex of plaza levels and buildings of which the example shown in FIG. 1 is only one of many possibilities.

What is claimed is:

1. A construction set of modular pieces for constructing a scale model of an arrangement of contemporary buildings comprising
   (a) a plurality of right angle parallelepiped plaza blocks each having a bottom, a top and four sides that define the block dimensions of height, width and length,
   (b) said plaza blocks having width and length dimensions that are whole number multiples of a dimension D,
   (c) said plaza blocks each having a top edge defining a step of tread dimension D that is uniform around the perimeter of its top,
   (d) a plurality of joint pieces for joining said plaza blocks in side-by-side relationship, each joint piece having a bottom, a top and four sides that define the piece dimensions of height, width and length,
   (e) said joint pieces being of a height equal to the rise of said plaza block top perimeter step,
   (f) said joint pieces width being equal to 2D,
   (g) said joint pieces length being integer multiples of D,
   (h) connection projections on the bottoms of said joint pieces and
   (i) connection receptacles for said projections in said plaza block step treads,
   (j) whereby one of said joint pieces is adapted to fill the adjacent steps of side by side blocks with said piece projections in said step tread receptacles, thereby joining said side-by-side blocks together.

2. A construction set as in claim 1 wherein,
   (a) said connection projections are pins and said connection receptacles are holes that receive said pins.

3. A construction set as in claim 1 wherein,
   (a) a plurality of outside rail straight and right angle corner pieces are provided for attachment to the top of said plaza block top perimeter step to provide an outside railing that projects upward from the top surface of said plaza block,
   (b) said outside rail pieces have a base that fills said perimeter step and a rail that projects from said base perpendicular thereto,
   (c) said base height is equal to the rise of said plaza block top perimeter step,
   (d) said outside rail right angle corner pieces include two legs each of which is an outside rail straight piece
   (e) whereby said outside rail pieces fill said plaza block top perimeter step forming a railing.

4. A construction set as in claim 1 wherein,
   (a) a plurality of right angle parallelepiped building blocks are provided, each having a bottom, a top and four sides that define the block dimensions of height, width and length,
   (b) said building blocks having width and length dimensions that are integer multiples of dimension D,
   (c) a plurality of inside rail pieces are provided including means for attachment to the top of at least one of said plaza block top perimeter steps to provide a ridge that projects upward around the perimeter of the top surface of said plaza block and fits inside the bottom of one of said building blocks,
   (d) said one building block bottom being recessed to fit snugly around said ridge,
   (e) whereby said one building block is adapted to be securely attached to the top of an assembly of said plaza blocks.

5. A construction set as in claim 4 wherein,
   (a) the bottom of each of said plaza blocks is adapted to fit said ridge provided on the top of another plaza block by said inside rail pieces attached thereto, (b) whereby said plaza blocks fit one on top of another to provide multiple level plaza areas.

6. A construction set as in claim 4 wherein,
(a) a plurality of right angle parallelepiped step fill pieces are provided for filling said plaza block top perimeter step, each straight edge piece having a bottom, a top and four sides that define the piece dimensions of height, width and length,
(b) said step fill pieces being of a height equal to the rise of said plaza block top perimeter step,
(c) said step fill pieces width being equal to D,
(d) said step fill pieces length being integer multiples of D,
(e) connection projections on the bottoms of said step fill pieces that fit said receptacles in said plaza block step treads,
(f) whereby one of said step fill edge pieces is adapted to fill said plaza block top perimeter step.

7. A construction set as in claim 6 wherein,
(a) said plaza blocks width and length dimensions are a whole number that is of sections long and each section is N times D long, where N is a whole number,
(b) said joint pieces are a whole number that is one or greater sections long and
(a) said step fill pieces length dimensions are one or greater sections long.

8. A construction set as in claim 4 wherein,
(a) the top of each of said building blocks is adapted to fit the bottom of another building block,
(b) whereby said building fit one on top of another to form a high rise building.

9. A construction set as in claim 8 wherein,
(a) said building blocks four sides provide the faces of the building represented thereby and simulate the appearance from the outside of a contemporary building.

10. A construction set as in claim 8 wherein,
(a) modular cap pieces are provided that fit on top of building block to provide thereon additional structures representative of structures sometimes provided on top of high rise buildings.

11. A construction set as in claim 1 wherein,
(a) said plaza blocks width and length dimensions are a whole number of sections long and each section is N times D long, where N is a whole number greater than two and
(b) said joint pieces length dimensions are a whole number of sections long.

12. A construction set as in claim 11 wherein,
(a) said inside rail pieces include straight pieces and corner pieces that include two legs each of which is a straight piece and
(b) said straight pieces length dimensions are a whole of sections long.

* * * * *